United States Patent [19]

Oosterkamp

[11] Patent Number: 5,154,880
[45] Date of Patent: Oct. 13, 1992

[54] NUCLEAR FUEL BUNDLE WITH COOLANT BYPASS CHANNEL

[75] Inventor: Willem J. Oosterkamp, San Jose, Calif.

[73] Assignee: General Electric Company, San Jose, Calif.

[21] Appl. No.: 769,166

[22] Filed: Sep. 27, 1991

Related U.S. Application Data

[63] Continuation of Ser. No. 597,454, Oct. 12, 1990, abandoned.

[51] Int. Cl.$^5$ ............................................. G21C 15/00
[52] U.S. Cl. ......................... 376/370; 376/210; 376/361; 376/444
[58] Field of Search ............ 376/370, 210, 221, 361, 376/443, 444, 438, 448, 440; 976/DIG. 60, DIG. 185

[56] References Cited

U.S. PATENT DOCUMENTS

| | | | |
|---|---|---|---|
| 3,715,274 | 2/1973 | Venier et al. | 376/440 |
| 3,935,064 | 1/1976 | Yellowlees | 376/411 |
| 4,035,233 | 7/1977 | Williamson et al. | 376/440 |
| 4,279,698 | 7/1981 | Doi et al. | 376/236 |
| 5,023,047 | 6/1991 | Nishida et al. | 376/370 |

FOREIGN PATENT DOCUMENTS

| | | |
|---|---|---|
| 0282600 | 9/1988 | European Pat. Off. |
| 0378384 | 7/1990 | European Pat. Off. ............ 376/440 |

OTHER PUBLICATIONS

*Derwent Publications* abstracting EP-378384—A issued to Hitachi Ltd., 1990.
G. Lill et al., "KWU's New 9×9 BWR Design Employs a Central Water Channel", *Nuclear Engineering International*, Feb. 1988, pp. 37, 41–42.
S. Helmersson et al., "SVEA-96: BWR Fuel for the 1990's", *Nuclear Europe*, Jan.-Feb. 1989, pp. 37–38.

*Primary Examiner*—Brooks H. Hunt
*Assistant Examiner*—Meena Chelliah
*Attorney, Agent, or Firm*—Robert R. Schroeder

[57] ABSTRACT

A fuel bundle for a natural-circulation boiling-water reactor includes at least one coolant bypass tube which is at least partially open at both its top and bottom and extends about ⅔ of the bundle height. Water within the bypass tube remains liquid. As it exits the top of the bypass tubes, it merges with and "cools" the flow exterior to the tube. This arrangement reduces the pressure drop across the core, increasing coolant flow. In addition, the merging coolant helps improve heat transfer at the maximum heat flux levels within the core. Lateral holes through the bypass tube can further enhance with heat transfer distribution in the core. The reduced pressure drop in the core and the more uniform heat flux distribution both permit a reactor to operate at higher power ratings.

6 Claims, 4 Drawing Sheets

5,154,880

NUCLEAR FUEL BUNDLE WITH COOLANT BYPASS CHANNEL

This is a continuation of copending U.S. patent application Ser. No. 07/597,454, filed Oct. 12, 1990, now abandoned.

BACKGROUND OF THE INVENTION

This invention relates to nuclear reactors and, more particularly, to a fuel bundle for a boiling-water nuclear reactor. A major objective of the present invention is to provide for greater power output for a boiling water reactor of a given size.

Fission reactors rely on fissioning of fissile atoms such as uranium isotopes (U233, U235) and plutonium isotopes (Pu239, Pu241). Upon absorption of a neutron, a fissile atom can disintegrate, yielding atoms of lower atomic weight and high kinetic energy along with several high-energy neutrons. The kinetic energy of the fission products is quickly dissipated as heat, which is the primary energy product of nuclear reactors. Some of the neutrons released during disintegration can be absorbed by other fissile atoms, causing a chain reaction of disintegration and heat generation. The fissile atoms in nuclear reactors are arranged so that the chain reaction can be self-sustaining.

To facilitate handling, fissile fuel is typically maintained in fuel elements. Typically, these fuel elements have a corrosion-resistant cladding. The fuel elements can be grouped together at fixed distances from each other in a fuel bundle. The fuel bundles include spacer grids to maintain alignment and spacing of the fuel bundles. A sufficient number of these fuel bundles are combined to form a reactor core capable of a self-sustaining chain reaction. Neutron-absorbing control rods are inserted into the core to control the reactivity of the core. The reactivity of the core can be adjusted by incremental insertions and withdrawals of the control rods.

In a boiling-water reactor (BWR), heat generated in the core is transferred by water flowing up through the core. Some of the water is converted to steam which can be extracted from the reactor vessel. The extracted steam can be used to drive a turbine, which in turn can drive a generator to produce electricity. Water not converted to steam is recirculated back to the base of the core.

In a BWR, water serves not only as a coolant but also as a moderator. In its role as moderator, the water slows the initially fast neutrons released during fissioning. The slowed or "thermal" neutrons have the appropriate energies for absorption by fissile fuel to produce further fissioning. Steam, because of its lower density, is a much poorer moderator than liquid water. As the water flows up through the core, the percentage of steam increases, so that moderation becomes less effective. Accordingly, some fuel bundles include coolant bypass channels which insulate 1%-2% of the water from the most intense heat generated at the fuel elements. These coolant bypass channels, which are generally in the form of a tube extending from the base to the top of the fuel bundle, provide moderation through the total vertical extent of the bundles. This insures sufficient liquid moderator at all levels within the fuel bundle.

One problem with this bypass approach is that a percentage of the coolant flow is used exclusively for the moderator function. An alternative design uses a convoluted partial height bypass channel. Water flowing up a tube is partially forced into a second interior tube. The outer tube is closed at the top, so water emerging from the top of the interior tube is forced downward and out peripheral holes.

Forced-circulation boiling-water reactors (FCBWRs) use pumps to promote water circulation, while natural-circulation boiling-water reactors (NCBWRs) rely on convection to promote water circulation without pumps. A typical NCBWR employs a chimney over its core to support a driving head. The driving head establishes a pressure differential between the region above the core and the downcomer. The downcomer is the annular space within the reactor vessel to the outside of the core and the chimney. The downcomer defines the path along which water exiting the chimney returns to the core. The pressure differential between the core and chimney on the one hand and the downcomer on the other determines the recirculation rate. The recirculation rate determines the maximum power that can be transferred from the core, and thus the maximum power output of the reactor.

One way to increase the power capability of a NCBWR is to increase chimney height. A taller chimney supports a greater driving head, which in turn supports a greater pressure differential. The resulting increased coolant flow permits more power to be transferred from the core.

However, increasing chimney height requires a larger reactor vessel. A larger reactor vessel requires a larger reactor containment complex. Reactor complex costs and complexity increase geometrically with chimney height. Basic changes, such as increasing chimney height, can only be applied prospectively. Such changes do not address increasing the performance of existing reactors of the forced-circulation type.

What is needed is a design which permits increased power output without increasing reactor size and complexity. This design should be applicable to new NCBWRs. Preferably, the improvement should also be applicable, on a retrofit basis, to enhance the value of existing FCBWRs.

SUMMARY OF THE INVENTION

In accordance with the present invention, a fuel bundle for a NCBWR includes at least one partial-length coolant bypass tube which is open at the top. The bypass tube extends from near the bottom of the fuel bundle to near the critical heat flux level, which can be 40%-85% toward the top of the bundle. The alignment and spacing of the bypass tube can be maintained by the same spacer grids used to support the fuel rods. A single central coolant bypass tube can be used. Alternatively, coolant bypass tubes can form a subarray of a larger array including the fuel elements. For example, the coolant bypass tubes and the fuel elements can define a square array, with the bypass tubes constituting a square subarray of the overall array. Preferably, at least 4% of the water flowing through the bundle flows through the one or more bypass tubes.

Water within a bypass tube remains liquid, as heat transfer between fuel elements through the main coolant flow and the bypass tube wall is limited due to a relatively small temperature gradient. Thus, the coolant bypass tube allows liquid water to merge with a water/steam mixture to improve moderation and heat transfer characteristics near the top of the core, where they are needed most. The water from the coolant bypass tube mixes with the exterior water, thereby "cooling" it in the sense of lowering its specific enthalpy. The benefits of the introduction of bypass coolant can be obtained to a lesser extent below the top of the bypass tubes using apertures along its vertical extent. These apertures slow the rate of boiling outside the tube. These apertures are located just above any nearby spacer grids to minimize turbulence-induced vibrations of the fuel rods. A constriction near the top of the tube can be used to force some water out of the lateral apertures.

Water flowing through the bypass tube can flow vertically to the top level of the bypass tube without encountering major sources of turbulence, such as spacer grids. While the concentric tube coolant channel mentioned above also bypasses spacer grids, it introduces additional flow impedance by requiring water to reverse direction and then flow laterally before merging with the flow outside the bypass tube. By decreasing turbulence and flow reversals, the present invention reduces the pressure drop in the core. The reduction is increased by admitting a relatively high percentage (4% or more) of coolant into the bypass tubes.

The reduced pressure drop translates into a greater pressure differential between the core-chimney region and the downcomer. Hence, coolant flow is increased and more power can be transferred from the core, thus providing for increased power output capability for an NCBWR. By embodying the present invention in a fuel bundle having the same form factor as existing fuel bundles, increased power output of existing reactors can be achieved.

Moreover, the present invention provides for greater moderation and less flow impedance than is provided by fuel bundles without coolant tubes. Compared to fuel bundles with full-length coolant channels, the present invention provides for full utilization of coolant for heat transfer, rather than dedicating a portion of the flow for moderation only. As a result and relative to fuel bundles having full-length bypass tubes, the present invention provides for a smaller volume of steam adjacent to fuel elements. The reduced steam fraction increases the flow cross section available to the water. This also reduces the pressure drop through the core, enhancing power transfer. The coolant bypass channel also enhances the nuclear and thermohydraulic stability of the fuel bundle, as the flow through this channel tends to smooth out density fluctuations at the level where the coolant bypass flow enters the main coolant flow.

Thus, the present invention provides increased power capacity relative to the various prior art NCBWR fuel bundles. Furthermore, this improved fuel bundle design can be incorporated in existing and prospective FCBWRs to obtain increased power density. These and other features and advantages of the present invention are apparent in the following description with references to the drawings below.

DESCRIPTION OF THE PREFERRED EMBODIMENTS

Figure 1:
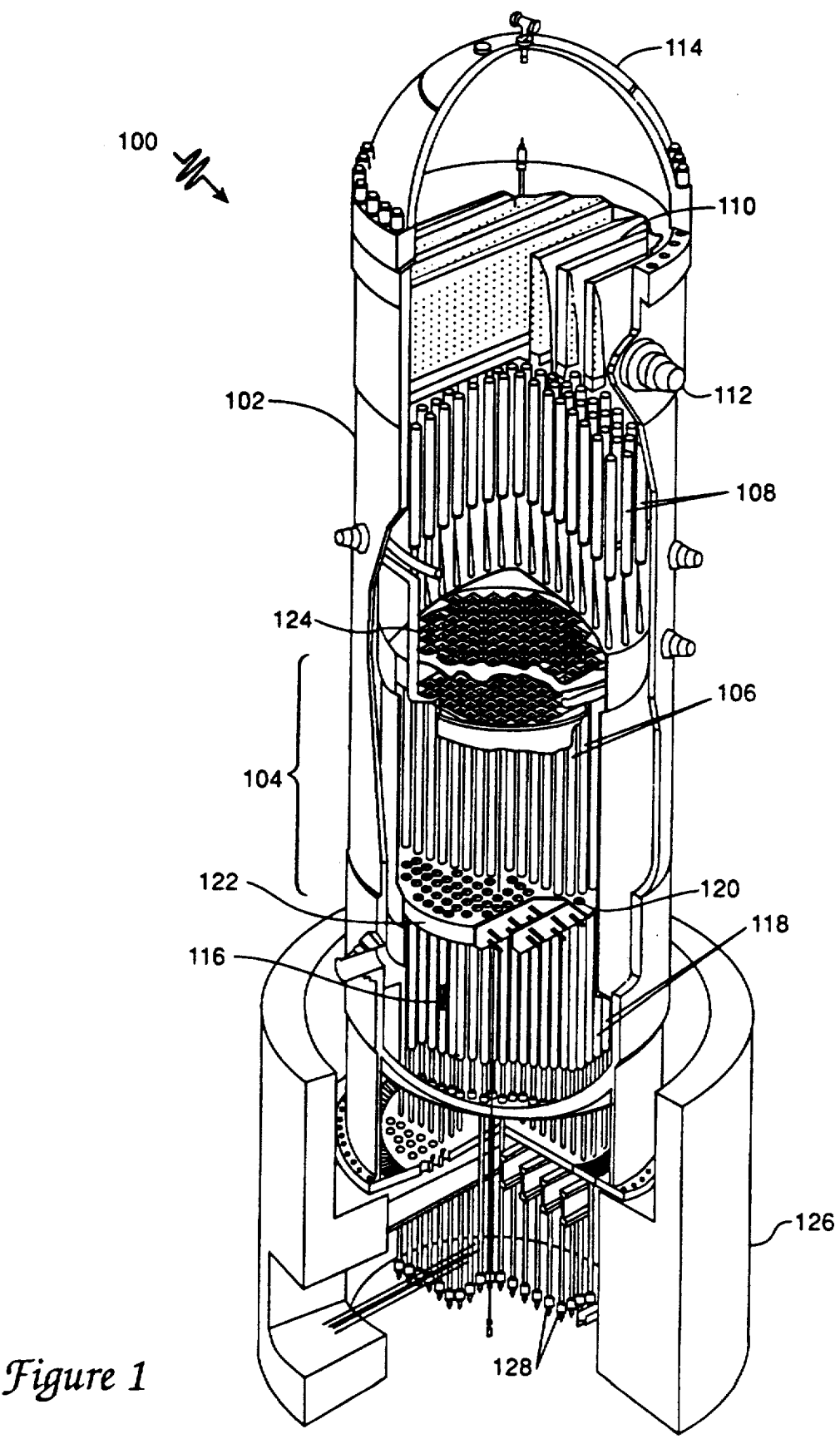
FIG. 1 is a partially schematic perspective and cutaway view of a natural-circulation boiling-water reactor which serves as the context for the present invention.

The preferred embodiment of the present invention is designed for use in a nuclear reactor 100 comprising a reactor vessel 102 and its internals, as shown in FIG. 1. Heat is generated within a core 104 of reactor 100, which includes fuel bundles 106 of fissile material. Water circulated up through core 104 is at least partially converted to steam. A steam separator 108 separates steam from water, which is recirculated. Residual water is removed from the steam by steam dryers 110. The steam then exits reactor 100 through a steam exit 112 near a vessel head 114.

The amount of heat generated in core 104 is regulated by inserting and withdrawing control blades 116. Control blades 116 are vertically extending elements with cruciform cross sections. They include rods of neutron-absorbing material, such as boron-carbide or hafnium. To the extent that a control blade 116 is inserted into core 104, it absorbs neutrons that would otherwise be available to promote the chain reaction which generates heat in core 104. Control rod guide tubes 118 below core 104 maintain the vertical motion of control blades 116 during insertion and withdrawal.

Fuel bundles 106 are supported from below by a fuel support casting 120 mounted on a core support plate 122 located at the base of core 104. A top guide 124 helps align fuel bundles 106 as they are lowered into core 104. Vessel 102 is mounted on a concrete pedestal 126 which defines a space below where access can be had to control rod drives 128.

Figure 2:
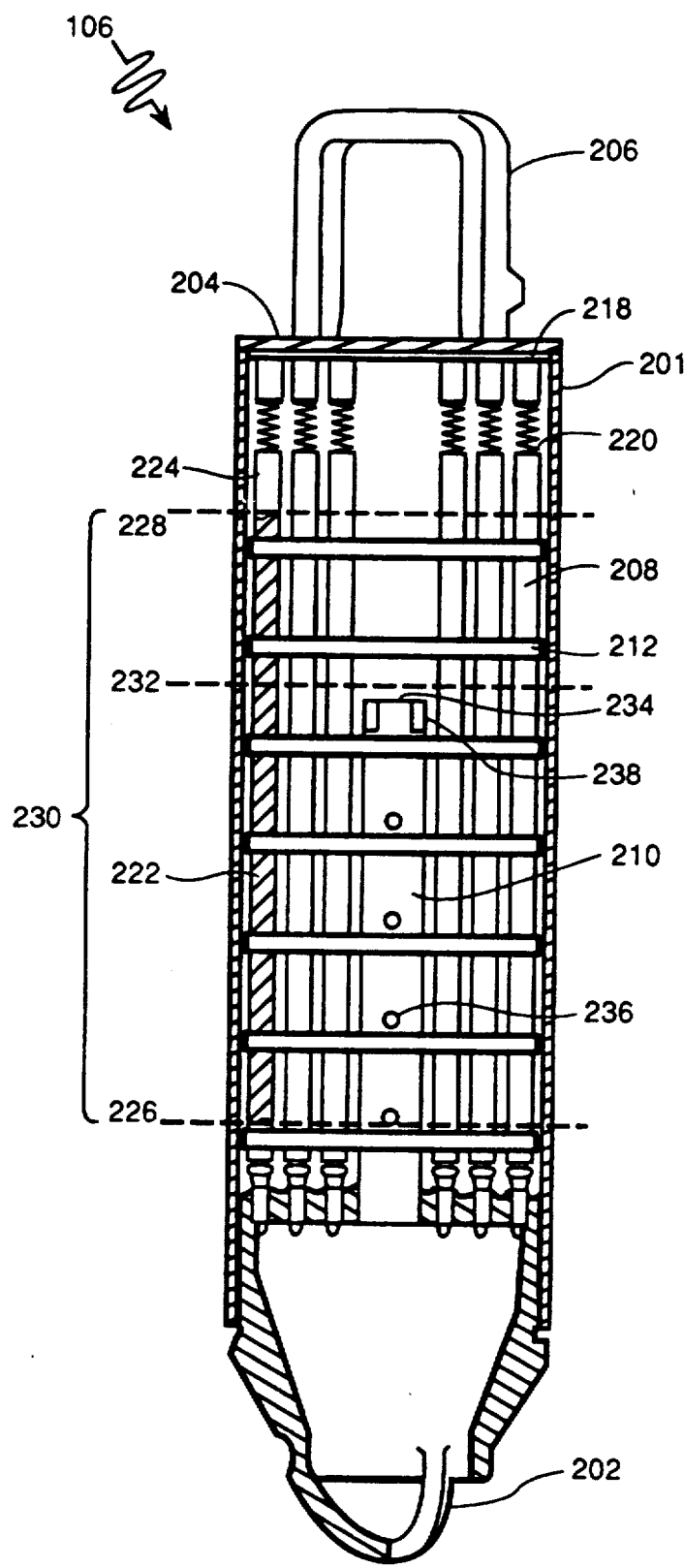
FIG. 2 is a schematic sectional elevational view of a fuel bundle of the of the reactor of FIG. 1.
Figure 3:
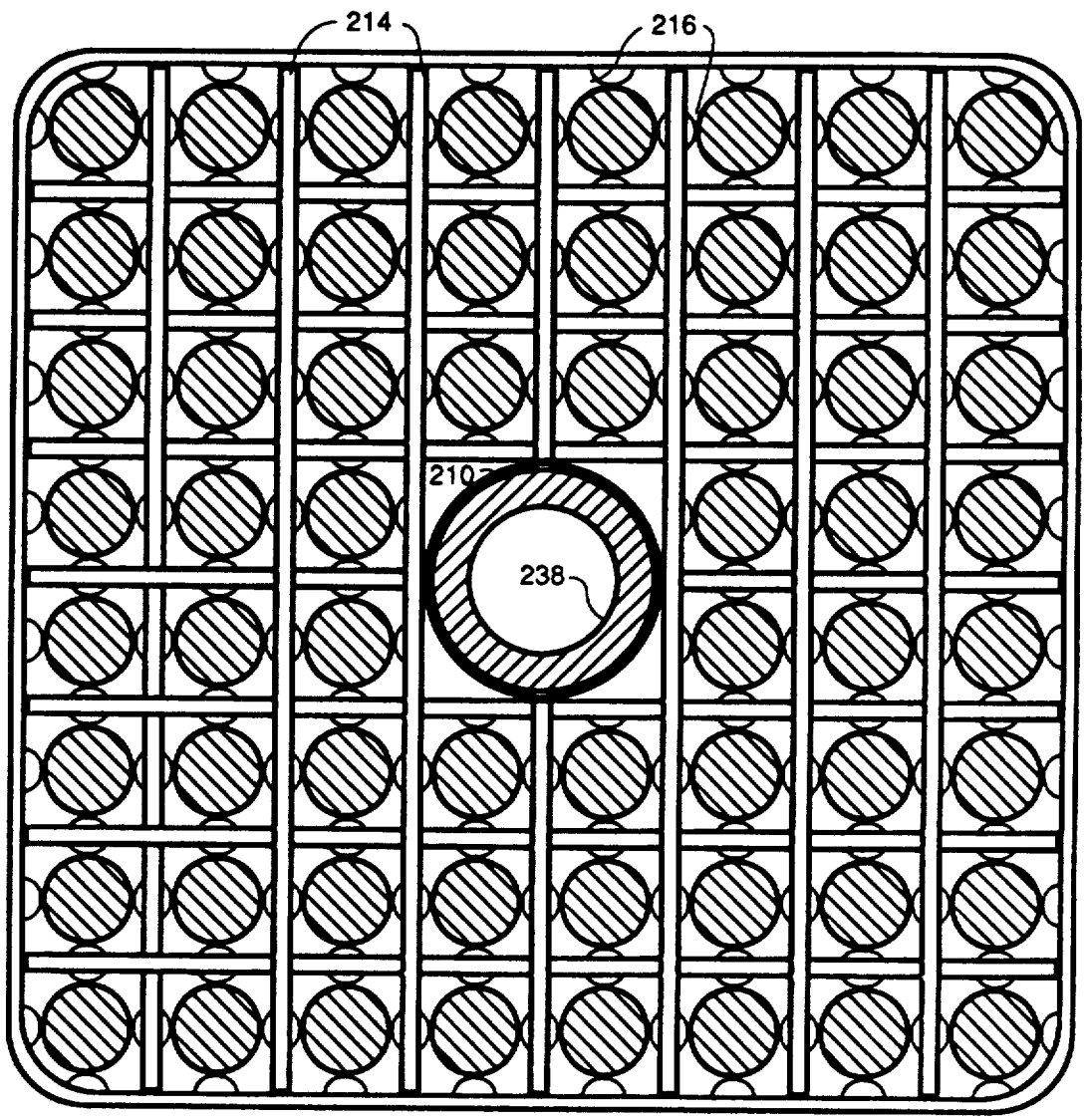
FIG. 3 is an elevational sectional view of the fuel bundle of FIG. 2.

As shown in FIG. 2, one of the fuel bundles 106 includes a housing 201, lower inlet end 202 and an upper outlet end 204. A grip 206 permits bundle 106 to be manipulated into and out of core 104. Fuel bundle 106 includes sixty fuel pins 208 arranged in an 8×8 array, with the middle four positions of the array occupied by a coolant bypass tube 210, as shown in FIGS. 2 and 3. The vertical alignment and spacing of fuel pins 208 are provided by seven spacer grids 212. Spacer grids 212 include grid plates 214 and springs 216. Springs 216 are mounted on plates 214 and flexibly support fuel pins 208. Bypass tube 210 is supported by grid plates 214, which are about 0.3 millimeters thick. Fuel pins 208 are coupled to a top plate 218 through coil springs 220 to accommodate thermal expansion. Moreover, fuel pins 208 and bypass tube 210 can slide relative to spacer grids 212 to accommodate thermal expansion.

Fuel pins 208 are partially filled with fissile fuel 222. Near the top of fuel pins 208 are plenums 224 to accommodate gaseous fission byproducts. Collectively, fuel pins 208 define a lowest level 226 of fuel and a highest level 228 of fuel. The lowest and highest levels define a fuel extent 230 for fuel bundle 106. Typically, a critical heat flux level 232 appears about ⅞ up along this fuel extent 230. The top 234 of bypass tube 210 is at about this critical heat flux level 232.

The introduction of bypass coolant into the main coolant flow at the top of bypass tube 210 induces a sudden change in the steam fraction along the vertical extent of bundle 106. To achieve a more uniform distribution of steam fraction by height, apertures 236 are formed in tube 210. The diameter of each aperture 236 is empirically determined to optimize the steam fraction profile. Alternatively, diameters can be calculated using known techniques for a typical core configuration and typical operational requirements. Each aperture 236 is situated just above one of the spacer grids 212 so that minimal vibrations are induced by water exiting bypass tube 210 through the aperture 236. In order to force bypass coolant through apertures 236, a partial closure 238 is used to define a constriction near the top of bypass tube 210.

Figure 4:
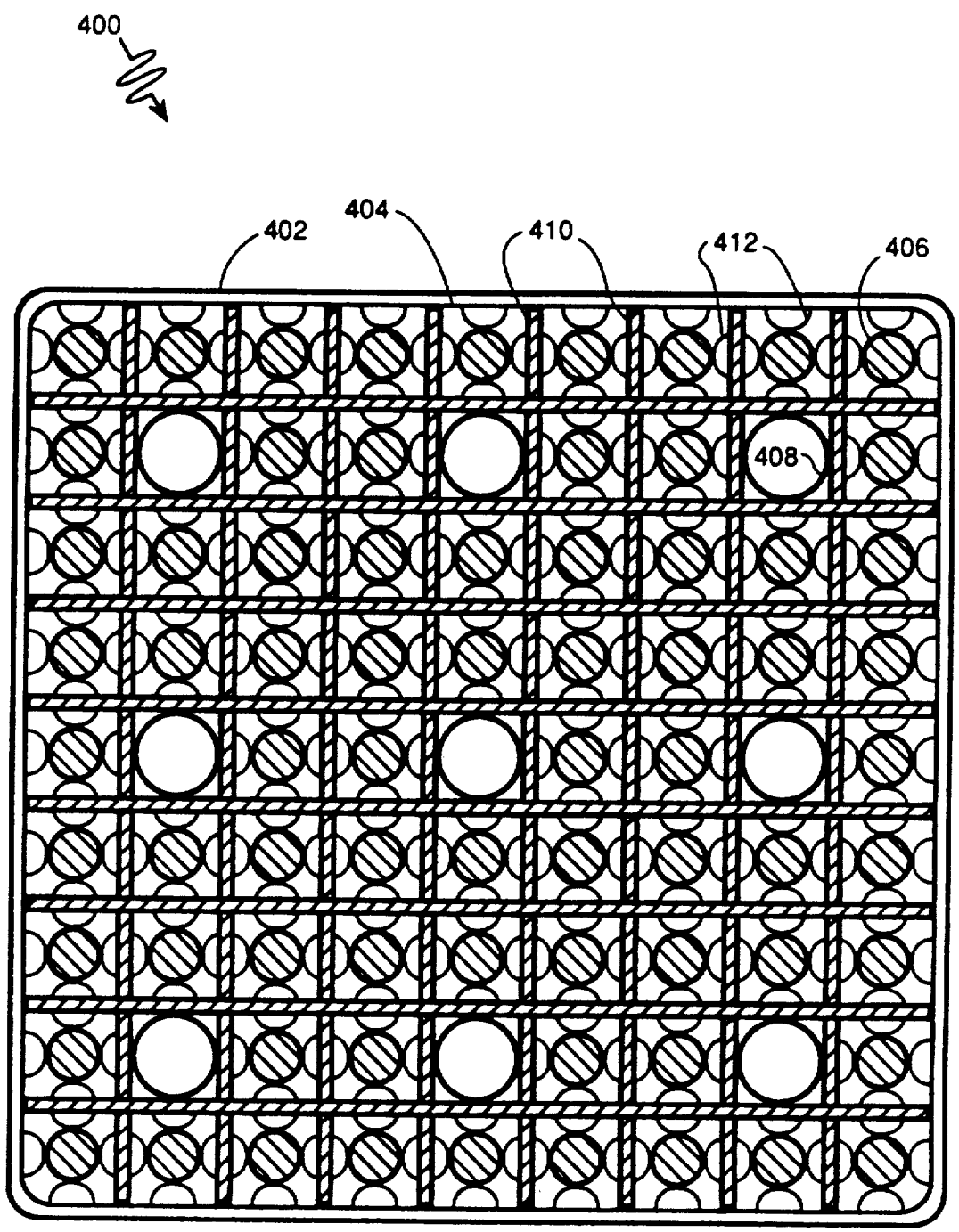
FIG. 4 is an elevational sectional view of another fuel bundle in accordance with the present invention.

An alternative fuel bundle 400 in accordance with the present invention includes a bundle housing 402, four spacer grids 404 (one of which is shown), seventy-two fuel elements 406 and nine coolant bypass tubes 408, as shown in FIG. 4. Collectively, fuel elements 406 and bypass tubes 408 are arranged in a square 9×9 array, with bypass tubes 408 arranged in a 3×3 subarray. Spacer grids 404 include spacer plates 410 and springs 412. Springs 412 flexibly align and space fuel elements 406. Spacer plates 410 hold springs 412 and support and space bypass tubes 408. The vertical relationships between bypass tubes 408 and fuel elements 406 are the same as in bundle 106. However, bypass tubes 408 do not include lateral apertures or a constriction. A major advantage of fuel bundle 400 is a more uniform distribution of moderation and coolant merging across the bundle cross section.

The specific dimensions of the bypass tubes in either embodiment depends on the heat flux profile of the including bundles. For a given coolant flow, heat transfer increases with increasing heat flux until a steam film develops which limits the conduction of heat from the fuel pins to the water. Increasing heat flux beyond this level dramatically decreases heat transfer. Operating a reactor at the peak heat transfer level is undesirable since a perturbation could cause fluctuations of hundreds of degrees Fahrenheit. These fluctuations can cause materials to oxidize and stress. To avoid these fluctuations, the reactor is operated on the upside of this heat transfer peak. Typically, a safety factor of 1.35 is provided for the maximum heat flux level.

The present invention increases power capacity by increasing the coolant flow rate, which permits a higher maximum acceptable heat flux. In addition, the bypass tubes are dimensioned to introduce relatively cool liquid at the maximum heat flux level. This provides additional latitude at this level so that higher power generation can be handled. However, the merging of relatively cool bypass coolant with the main coolant flow at the top of bypass tube has the effect of moving the peak heat flux below the level at which merging occurs. Adding apertures, such as apertures 236 in bundle 106, further smoothes the vertical heat flux profile, allowing higher operating powers without risking excursions beyond the peak heat transfer point.

The present invention provides for fuel bundles of different dimensions, which can be selected as a function of the incorporating reactor. Different numbers and arrangements of fuel elements are provided for. One or more bypass tubes can be utilized. The bypass tubes can have a variety of cross-sectional shapes, including circular, square, and triangular. Coolant bypass tubes can have their inlets at or below the lowest level in the bundle containing fuel.

The bypass tubes can extend to a level 50%–85% of the fuel extent of the bundle. For example, the top of a bypass tube extending to a 66% level would be twice as close to the highest level of the bundle having fuel than the top is to the lowest level of the bundle having fuel. Different types of contrictions can be used in the bypass tubes. Alternatively, the diameter of the coolant bypass channels can be reduced. In some cases, no constriction is required. Generally, constriction is required where lateral apertures are used. In addition, a constriction can be used when otherwise inadequate coolant would flow outside the bypass tube. In this case, the constriction is preferably at the base of the bypass tube. These and other modifications to and variations upon the described embodiments are provided for by the present invention, the scope of which is limited only by the following claims.

What is claimed is:

1. A fuel bundle for a boiling-water nuclear reactor, said reactor having a core, operation of said reactor resulting in an upward coolant flow through said core, said bundle comprising:

a vertically extending bundle housing having a bottom end and a top end;

plural vertically extending fuel elements, each of said fuel elements containing fissile fuel, said fuel elements collectively defining a vertical fuel extent within said housing, said fuel extent extending from a lowest fuel level to a highest fuel level;

spacer elements supporting and spacing said fuel elements; and a coolant bypass tube extending parallel to said fuel elements, said bypass tube having a top end and a bottom end, said bypass tube being at least partially open at its bottom end and at least partially open at its top end, said bottom end being below said lowest fuel level so as to admit water and said top end being at a level which is 50%–85% of said vertical fuel extent above said lowest fuel level.

2. A fuel bundle as recited in claim 1 wherein said spacer elements are arranged in a vertically extending series so that each of said spacer elements is at a respective spacer level, said spacer elements including a pair of successive spacer elements so that none of said spacer elements is at a level between the levels of said pair, said pair having a lower spacer element and an upper spacer element, said bypass tube having an aperture along its vertical extent and between the levels of said lower and upper spacer elements, said aperture being closer to said lower spacer element than to said upper spacer element.

3. A fuel bundle as recited in claim 1 wherein said bypass tube is configured so that at least 4% of the water flowing through said bundle flows through said tube.

4. A fuel bundle as recited in claim 1 wherein said bypass tube is one of plural bypass tubes distributed among said fuel elements.

5. A fuel bundle as recited in claim 4 wherein said bypass tubes and said fuel elements are arranged collectively in a square array and said bypass tubes are arranged in a square subarray of said array.

6. A fuel bundle as recited in claim 4 wherein said bypass tubes are configured so that at least 4% of the water flowing through said bundle flows through said bypass tubes through said bypass tubes.

* * * * *

REEXAMINATION CERTIFICATE (2513th)
United States Patent [19]
Oosterkamp

[11] B1 5,154,880
[45] Certificate Issued  Mar. 28, 1995

[54] NUCLEAR FUEL BUNDLE WITH COOLANT BYPASS CHANNEL

[75] Inventor: Willem J. Oosterkamp, San Jose, Calif.

[73] Assignee: General Electric Company, San Jose, Calif.

Reexamination Request:
No. 90/003,483, Jul. 1, 1994

Reexamination Certificate for:
Patent No.: 5,154,880
Issued: Oct. 13, 1992
Appl. No.: 769,166
Filed: Sep. 27, 1991

Related U.S. Application Data

[63] Continuation of Ser. No. 597,454, Oct. 12, 1990, abandoned.

[51] Int. Cl.$^6$ ............................................. G21C 15/00
[52] U.S. Cl. ................................. 376/370; 376/210; 376/361; 376/444
[58] Field of Search ............... 376/370, 210, 221, 361, 376/443, 444, 438, 448, 440; 976/DIG. 60, DIG. 188

[56] References Cited

U.S. PATENT DOCUMENTS

| | | | |
|---|---|---|---|
| 4,666,664 | 5/1987 | Doshi | 376/261 |
| 4,803,044 | 2/1989 | Patterson | 376/444 |

FOREIGN PATENT DOCUMENTS

| | | |
|---|---|---|
| 0204288 | 12/1986 | European Pat. Off. . |
| 0283935 | 9/1988 | European Pat. Off. . |
| 0322528 | 7/1989 | European Pat. Off. . |

*Primary Examiner*—Donald P. Walsh

[57] ABSTRACT

A fuel bundle for a natural-circulation boiling-water reactor includes at least one coolant bypass tube which is at least partially open at both its top and bottom and extends about ⅔ of the bundle height. Water within the bypass tube remains liquid. As it exits the top of the bypass tubes, it merges with and "cools" the flow exterior to the tube. This arangement reduces the pressure drop across the core, increasing coolant flow. In addition, the merging coolant helps improve heat transfer at the maximum heat flux levels within the core. Lateral holes through the bypass tube can further enhance with heat transfer distribution in the core. The reduced pressure drop in the core and the more uniform heat flux distribution both permit a reactor to operate at higher power ratings.

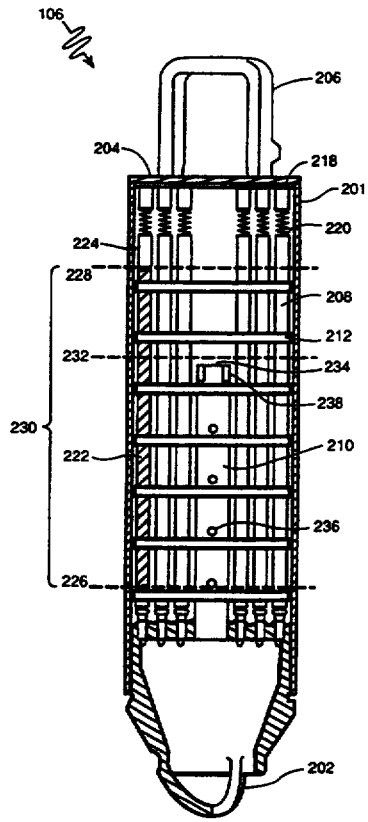

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1-6 is confirmed.

* * * * *